(12) United States Patent
Barker et al.

(10) Patent No.: US 10,876,413 B2
(45) Date of Patent: Dec. 29, 2020

(54) TURBINE AIRFOILS WITH MICRO COOLING FEATURES

(71) Applicants: Rolls-Royce Corporation, Indianapolis, IN (US); Rolls-Royce North American Technologies Inc., Indianapolis, IN (US)

(72) Inventors: Brett J. Barker, Indianapolis, IN (US); Jeffrey F. Rhodes, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/417,868

(22) Filed: May 21, 2019

(65) Prior Publication Data

US 2019/0292919 A1    Sep. 26, 2019

Related U.S. Application Data

(63) Continuation of application No. 15/214,799, filed on Jul. 20, 2016, now Pat. No. 10,329,924.

(60) Provisional application No. 62/199,679, filed on Jul. 31, 2015, provisional application No. 62/199,671, filed on Jul. 31, 2015.

(51) Int. Cl.
| | |
|---|---|
| *F01D 5/18* | (2006.01) |
| *F01D 5/14* | (2006.01) |
| *F01D 9/04* | (2006.01) |
| *F01D 25/12* | (2006.01) |

(52) U.S. Cl.
CPC ............. *F01D 5/187* (2013.01); *F01D 5/147* (2013.01); *F01D 5/189* (2013.01); *F01D 9/041* (2013.01); *F01D 25/12* (2013.01); *F05D 2220/32* (2013.01); *F05D 2260/201* (2013.01); *F05D 2260/202* (2013.01); *F05D 2260/2212* (2013.01); *Y02T 50/60* (2013.01)

(58) Field of Classification Search
CPC .......... F01D 5/187; F01D 25/12; F01D 5/189; Y02T 50/676; F05D 2260/202; F05D 2260/201; F05D 2260/2212
See application file for complete search history.

(56) References Cited

U.S. PATENT DOCUMENTS

| | | | | |
|---|---|---|---|---|
| 3,574,481 A ‡ | 4/1971 | Pyne, Jr. | ................. | F01D 5/189 416/90 |
| 6,213,714 B1 ‡ | 4/2001 | Rhodes | ................... | F01D 5/186 416/96 |
| 6,213,715 B1 ‡ | 4/2001 | Larochelle | ............ | F04D 25/105 416/11 |

(Continued)

OTHER PUBLICATIONS

Phil Ligrani, "Heat Transfer Augmentation Technologies for Internal Cooling of Turbine Components of Gas Turbine Engines", International Journal of Rotating Machinery, V. 2013, Article ID 275653 (32 pages).‡

(Continued)

*Primary Examiner* — Atif H Chaudry
(74) *Attorney, Agent, or Firm* — Barnes & Thornburg LLP

(57) ABSTRACT

A blade used in a gas turbine engine includes a pair of pedestals and an airfoil coupled between the pedestals. The airfoil includes cooling features to cool the airfoil.

19 Claims, 6 Drawing Sheets

(56) References Cited

U.S. PATENT DOCUMENTS

| | | | |
|---|---|---|---|
| 6,402,470 B1 ‡ | 6/2002 | Kvasnak | F01D 5/187 415/115 |
| 6,769,866 B1 ‡ | 8/2004 | Kannefass | F01D 5/147 415/115 |
| 6,773,230 B2 * | 8/2004 | Bather | F01D 5/186 415/115 |
| 7,137,776 B2 ‡ | 11/2006 | Draper | F23R 3/005 415/11 |
| 7,189,060 B2 ‡ | 3/2007 | Liang | F01D 5/081 415/11 |
| 7,527,474 B1 ‡ | 5/2009 | Liang | F01D 5/186 416/1 |
| 7,775,768 B2 ‡ | 8/2010 | Devore | F01D 5/187 416/97 |
| 8,109,726 B2 ‡ | 2/2012 | Liang | F01D 5/187 416/97 |
| 8,533,949 B2 ‡ | 9/2013 | Bunker | F01D 5/147 29/889 |
| 8,601,691 B2 ‡ | 12/2013 | Rebak | F01D 5/184 29/889 |
| 8,647,053 B2 ‡ | 2/2014 | Hsu | F01D 9/023 415/11 |
| 8,651,805 B2 ‡ | 2/2014 | Lacy | F01D 5/186 415/17 |
| 8,673,397 B2 ‡ | 3/2014 | Bunker | C23C 4/02 427/25 |
| 8,721,285 B2 ‡ | 5/2014 | Liang | F01D 5/187 415/115 |
| 8,727,727 B2 ‡ | 5/2014 | Bunker | F01D 5/147 416/24 |
| 8,739,404 B2 ‡ | 6/2014 | Bunker | F01D 5/147 29/889 |
| 8,753,071 B2 ‡ | 6/2014 | Bunker | F01D 5/187 415/11 |
| 8,938,879 B2 ‡ | 1/2015 | Bunker | F01D 5/147 29/889 |
| 2010/0183424 A1 | 7/2010 | Roy | |
| 2010/0183427 A1 ‡ | 7/2010 | Liang | F01D 5/187 415/115 |
| 2010/0226788 A1 * | 9/2010 | Liang | F01D 5/188 416/97 R |
| 2012/0163994 A1 ‡ | 6/2012 | Kwon | F01D 5/186 416/97 |
| 2012/0201653 A1 * | 8/2012 | Moga | F01D 5/147 415/115 |
| 2013/0156600 A1 ‡ | 6/2013 | Bunker | F01D 5/186 416/97 |
| 2013/0272850 A1 ‡ | 10/2013 | Bunker | F01D 5/147 415/11 |
| 2013/0315748 A1 ‡ | 11/2013 | Lacy | F01D 5/20 416/97 |
| 2013/0315749 A1 ‡ | 11/2013 | Zhang | F01D 5/20 416/97 |
| 2014/0126995 A1 ‡ | 5/2014 | Schick | F01D 5/18 415/11 |
| 2014/0169943 A1 ‡ | 6/2014 | Bunker | C23C 4/02 415/11 |
| 2015/0016961 A1 ‡ | 1/2015 | Shepherd | F01D 5/186 415/115 |
| 2015/0198050 A1 ‡ | 7/2015 | Lee | F01D 5/188 415/11 |

OTHER PUBLICATIONS

Extended European Search Report, European Application No. 16180516.3-1610, dated Dec. 13, 2016, 6 pages.‡

* cited by examiner
‡ imported from a related application

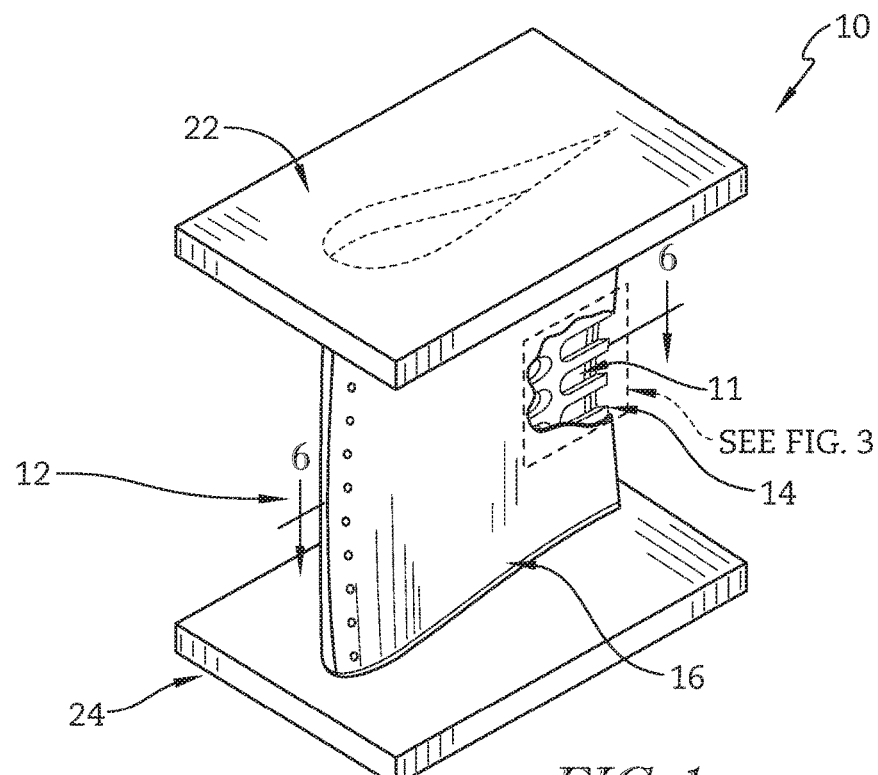
FIG. 1
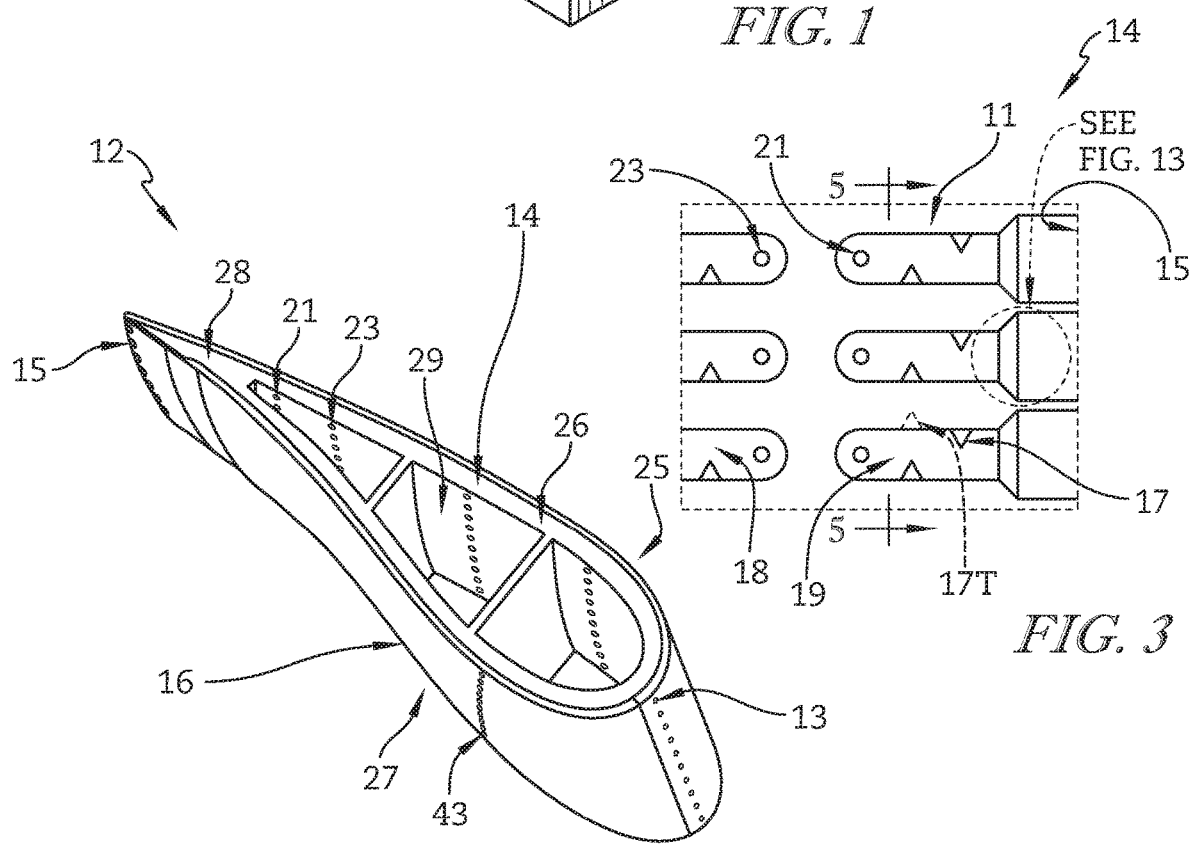
FIG. 2
FIG. 3

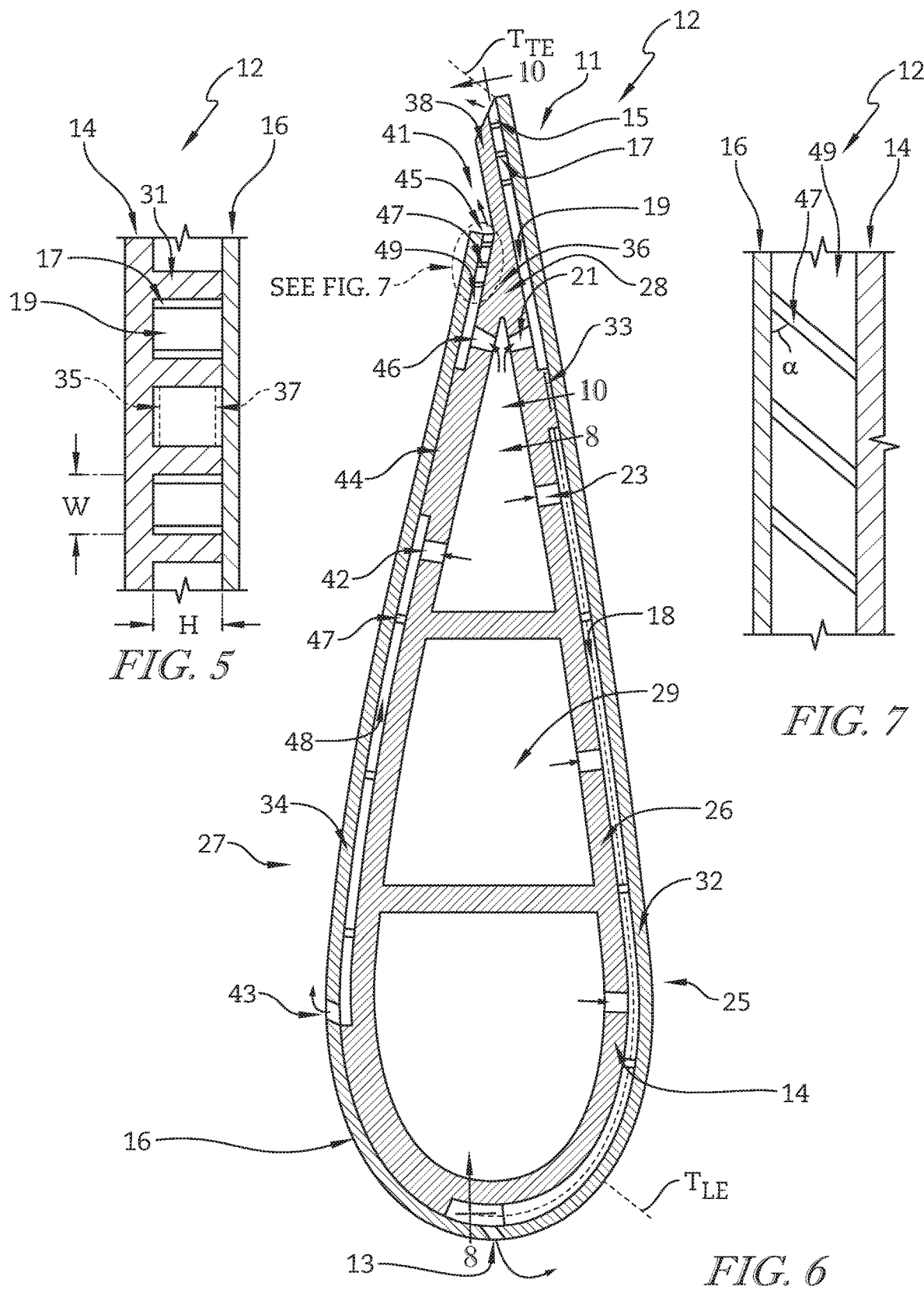

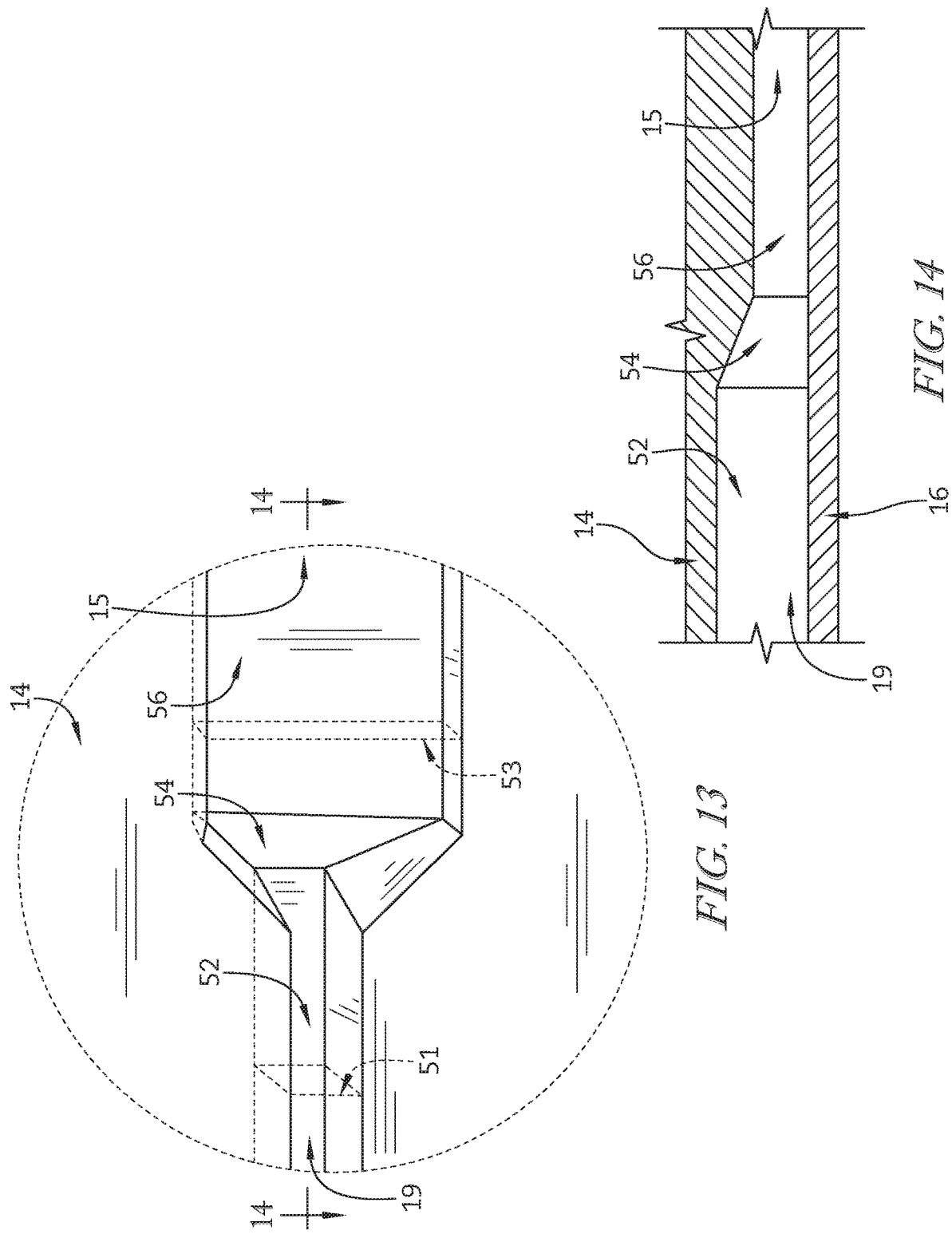

TURBINE AIRFOILS WITH MICRO COOLING FEATURES

CROSS REFERENCE TO RELATED APPLICATIONS

This application is a continuation of U.S. patent application Ser. No. 15/214,799, filed Jul. 20, 2016, which claims priority to and the benefit of U.S. Provisional Patent Application No. 62/199,671 and U.S. Provisional Patent Application No. 62/199,679, both filed 31 Jul. 2015, the disclosures of which are now expressly incorporated herein by reference.

FIELD OF THE DISCLOSURE

The present disclosure relates generally to gas turbine engines, and more specifically to airfoils used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Modern gas turbine engines produce high gas temperature environments that are typically above the melting temperature of the internal hardware. In order to survive in these conditions, turbine hardware typically uses a combination of cooling mechanisms to maintain an acceptable temperature. These mechanisms may include film cooling, thermal barrier coatings (TBC), and internal cooling devices. For airfoils, the trailing edge is often the most difficult region to cool due to reduced film effectiveness and reduced internal volume for internal cooling. Film cooling can be costly in terms of stage efficiency, especially in high Mach regions, and large volumes of cooling air are required for present internal cooling devices. Thus, a need exists for improved devices and methods for airfoil cooling.

SUMMARY

The present disclosure may comprise one or more of the following features and combinations thereof.

According to the present disclosure, an airfoil for use in a gas turbine engine and having a pressure side and a suction side may include a spar and a skin coupled to an exterior surface of the spar. The spar may be formed to define a cooling air plenum adapted to receive a flow of cooling air. The skin may be positioned to at least partially cover the spar along the pressure side and the suction side.

In illustrative embodiments, at least one axially extending groove may be formed in the exterior surface of the spar on the pressure side that defines at least one cooling passageway between the spar and the skin. At least one inlet port may be formed in the spar adjacent a trailing edge of the spar. The at least one inlet port may be in fluid communication with the cooling air plenum and the at least one cooling passageway to pass the flow of cooling air into the at least one cooling passageway from the cooling air plenum. At least one outlet port may be formed through the skin on the pressure side and axially forward of the at least one inlet port. The at least one outlet port may be configured to pass the flow of cooling air from the at least one cooling passageway to an exterior of the airfoil. In some situations, the outlet port may be downstream of the inlet port such that the trailing edge scheme can terminate in a row of holes instead of a slot. At least one turbulator may be positioned within the at least one cooling passageway.

In illustrative embodiments, the at least one axially extending groove includes a plurality of axially extending grooves formed in the exterior surface of the spar on the pressure side and radially spaced apart from one another to define a plurality of stand-offs therebetween, wherein the plurality of axially extending grooves define a plurality of cooling passageways between the spar and the skin, and wherein the at least one inlet port includes a plurality of inlet ports formed in the spar adjacent a trailing edge of the spar.

In illustrative embodiments, the skin may be bonded to at least the plurality of stand-offs such that the flow of cooling air in one cooling passageway is separated from the flow of cooling air in an adjacent cooling passageway. In illustrative embodiments, a height of each cooling passageway may be defined between the spar and the skin and a width of each cooling passageway may be defined between adjacent stand-offs.

In illustrative embodiments, each cooling passageway may have a constant height and constant width along a length of the cooling passageway. In illustrative embodiments, at least some cooling passageways may have a variable height and variable width along a length of the cooling passageways.

In illustrative embodiments, each cooling passageway may have a single inlet port associated therewith. In illustrative embodiments, the at least one outlet port may include a plurality of outlet ports formed through the skin on the pressure side and axially forward of the inlet ports.

In illustrative embodiments, the outlet ports may be positioned axially aft of a leading edge of the airfoil.

In illustrative embodiments, each cooling passageway may have at least two inlet ports associated therewith. In illustrative embodiments, each cooling passageway may have at least two outlet ports associated therewith.

In illustrative embodiments, the at least one cooling passageway may include a plurality of inlet ports and a plurality of turbulators positioned between the plurality of inlet ports. In illustrative embodiments, the at least one cooling passageway may include a plurality of inlet ports positioned toward an aft end of the airfoil and a plurality of turbulators positioned toward a fore end of the airfoil.

According to the present disclosure, an airfoil for use in a gas turbine engine and having a pressure side and a suction side may include a spar and a skin coupled to an exterior surface of the spar. The spar may be formed to define a cooling air plenum adapted to receive a flow of cooling air. The skin may be positioned to at least partially cover the spar along the pressure side and the suction side.

In illustrative embodiments, at least one axially extending groove may be formed in the exterior surface of the spar on the suction side that defines at least one cooling passageway between the spar and the skin. At least one inlet port may be formed in the spar adjacent a trailing edge of the spar. The at least one inlet port may be in fluid communication with the cooling air plenum and the at least one cooling passageway to pass the flow of cooling air into the at least one cooling passageway from the cooling air plenum. At least one outlet port may be formed through the skin on the suction side and axially forward of the at least one inlet port. The at least one outlet port may be configured to pass the flow of cooling air from the at least one cooling passageway to an exterior of the airfoil. At least one turbulator may be positioned within the at least one cooling passageway.

In illustrative embodiments, the at least one axially extending groove may include a plurality of axially extending grooves formed in the exterior surface of the spar on the suction side and radially spaced apart from one another to define a plurality of stand-offs therebetween. The plurality of axially extending grooves may define a plurality of cooling passageways between the spar and the skin. The at least one inlet port may include a plurality of inlet ports formed in the spar adjacent a trailing edge of the spar.

In illustrative embodiments, the skin may be bonded to at least the plurality of stand-offs such that the flow of cooling air in one cooling passageway is separated from the flow of cooling air in an adjacent cooling passageway. In illustrative embodiments, a height of each cooling passageway may be defined between the spar and the skin and a width of each cooling passageway may be defined between adjacent stand-offs.

In illustrative embodiments, each cooling passageway may have a constant height and constant width along a length of the cooling passageway. In illustrative embodiments, at least some cooling passageways may have a variable height and variable width along a length of the cooling passageways.

In illustrative embodiments, each cooling passageway may have a single inlet port associated therewith. In illustrative embodiments, the at least one outlet port may include a plurality of outlet ports formed through the skin on the suction side and axially forward of the inlet ports.

In illustrative embodiments, the outlet ports may be positioned substantially at a leading edge of the airfoil. In illustrative embodiments, each cooling passageway may have at least two inlet ports associated therewith.

In illustrative embodiments, each cooling passageway may have at least two outlet ports associated therewith. In illustrative embodiments, the at least one cooling passageway may include a plurality of inlet ports and a plurality of turbulators positioned between the plurality of inlet ports.

In illustrative embodiments, the at least one cooling passageway may include a plurality of inlet ports positioned toward an aft end of the airfoil and a plurality of turbulators positioned toward a fore end of the airfoil.

According to the present disclosure, an airfoil for use in a gas turbine engine and having a pressure side and a suction side may include a spar and a skin coupled to an exterior surface of the spar. The spar may be formed to define a cooling air plenum adapted to receive a flow of cooling air. The spar may have an axially forward body section and an axially aft tail section. The skin may be positioned to at least partially cover the body section and tail section of the spar along the pressure side and the suction side.

In illustrative embodiments, a first plurality of axially extending grooves may be formed in the exterior surface of the body section of the spar and define a first plurality of cooling passageways between the spar and the skin. A second plurality axially extending grooves may be formed in the exterior surface of the tail section of the spar and define a second plurality of cooling passageways between the spar and skin. A first plurality of inlet ports may be formed in the spar and in fluid communication with the cooling air plenum and the first plurality of cooling passageways to pass the flow of cooling air into the first plurality of cooling passageways from the cooling air plenum. A second plurality of inlet ports may be formed in the spar and in fluid communication with the cooling air plenum and the second plurality of cooling passageways to pass the flow of cooling air into the second plurality of cooling passageways from the cooling air plenum. A radially extending separator wall may be defined between the first plurality of cooling passageways and the second plurality of cooling passageways and may be configured to separate the flow of cooling air within the first plurality of cooling passageways from the flow of cooling air within the second plurality of cooling passageways. A plurality of outlet ports may be formed through the skin to pass the flow of cooling air from the first plurality of cooling passageways to an exterior of the airfoil. A plurality of outlet slots may be defined between the spar and the skin and configured to pass the flow of cooling air from the second plurality of cooling passageways to an exterior of the airfoil.

In illustrative embodiments, the airfoil may further include at least one turbulator positioned within each of the first plurality of cooling passageways and each of the second plurality of cooling passageways.

In illustrative embodiments, the skin may include a suction-side panel and a pressure-side panel. The suction-side panel may be coupled to the exterior surface of the spar and positioned to at least partially cover the body section and tail section of the spar along the suction side. The pressure-side panel may be coupled to the exterior surface of the spar and positioned to at least partially cover the body section and tail section of the spar along the pressure side.

In illustrative embodiments, the first and second plurality of grooves may be formed on the pressure side and the suction side of the spar.

According to another aspect of the present disclosure, an airfoil for use in a gas turbine engine and having a pressure side and a suction side may include a spar and a skin coupled to an exterior surface of the spar. The spar may be formed to define a cooling air plenum adapted to receive a flow of cooling air. The skin may be positioned to at least partially cover the spar along the pressure side and the suction side.

In illustrative embodiments, at least one axially extending groove may be formed in the exterior surface of the spar on the suction side that defines at least one cooling passageway between the spar and the skin. At least one inlet port may be formed in the spar and in fluid communication with the cooling air plenum and the at least one cooling passageway to pass the flow of cooling air into the at least one cooling passageway from the cooling air plenum. The cooling passageway may extend between the at least one inlet port and an outlet slot at a trailing end of the airfoil. The outlet slot may be configured to pass the flow of cooling air from the at least one cooling passageway to an exterior of the airfoil. At least one turbulator may be positioned within the at least one cooling passageway.

In illustrative embodiments, the at least one axially extending groove may include a plurality of axially extending grooves formed in the exterior surface of the spar on the suction side and radially spaced apart from one another to define a plurality of stand-offs therebetween. The plurality of axially extending grooves may define a plurality of cooling passageways between the spar and the skin. The at least one inlet port may include a plurality of inlet ports formed in the spar.

In illustrative embodiments, the skin may be bonded to at least the plurality of stand-offs such that the flow of cooling air in one cooling passageway is separated from the flow of cooling air in an adjacent cooling passageway. In illustrative embodiments, a height of each cooling passageway may be defined between the spar and the skin and a width of each cooling passageway may be defined between adjacent stand-offs.

In illustrative embodiments, each cooling passageway may have a constant height and constant width along a length of the cooling passageway. In illustrative embodiments, at least some cooling passageways may have a variable height and variable width along a length of the cooling passageways.

In illustrative embodiments, each cooling passageway may have a single inlet port associated therewith. In illustrative embodiments, each cooling passageway may extend between at least one of the plurality of inlet ports and an outlet slot at the trailing end of the airfoil. Each outlet slot may be configured to pass the flow of cooling air from the at least one cooling passageway to an exterior of the airfoil. In illustrative embodiments, the outlet slots may be substantially rectangular.

According to the present disclosure, an airfoil for use in a gas turbine engine and having a pressure side and a suction side may include a spar and a skin coupled to an exterior surface of the spar. The spar may be formed to define a cooling air plenum adapted to receive a flow of cooling air. The skin may be positioned to at least partially cover the spar along the pressure side and the suction side.

In illustrative embodiments, at least one axially extending groove may be formed in the exterior surface of the spar on the pressure side that defines at least one cooling passageway between the spar and the skin. At least one inlet port may be formed in the spar and in fluid communication with the cooling air plenum and the at least one cooling passageway to pass the flow of cooling air into the at least one cooling passageway from the cooling air plenum. The cooling passageway may extend between the at least one inlet port and an outlet slot at a trailing end of the airfoil. The outlet slot may be configured to pass the flow of cooling air from the at least one cooling passageway to an exterior of the airfoil. At least one turbulator may be positioned within the at least one cooling passageway.

In illustrative embodiments, the at least one axially extending groove may include a plurality of axially extending grooves formed in the exterior surface of the spar on the suction side and radially spaced apart from one another to define a plurality of stand-offs therebetween. The plurality of axially extending grooves may define a plurality of cooling passageways between the spar and the skin. The at least one inlet port may include a plurality of inlet ports formed in the spar.

In illustrative embodiments, the skin may be bonded to at least the plurality of stand-offs such that the flow of cooling air in one cooling passageway is separated from the flow of cooling air in an adjacent cooling passageway. In illustrative embodiments, a height of each cooling passageway may be defined between the spar and the skin and a width of each cooling passageway may be defined between adjacent stand-offs.

In illustrative embodiments, each cooling passageway may have a constant height and constant width along a length of the cooling passageway. In illustrative embodiments, at least some cooling passageways may have a variable height and variable width along a length of the cooling passageways.

In illustrative embodiments, each cooling passageway may have a single inlet port associated therewith. In illustrative embodiments, each cooling passageway may extend between at least one of the plurality of inlet ports and an outlet slot at the trailing end of the airfoil. Each outlet slot may be configured to pass the flow of cooling air from the at least one cooling passageway to an exterior of the airfoil. In illustrative embodiments, the outlet slots may be substantially rectangular.

According to the present disclosure, an airfoil for use in a gas turbine engine and having a pressure side and a suction side may include a spar and a skin coupled to an exterior surface of the spar. The spar may be formed to define a cooling air plenum adapted to receive a flow of cooling air. The skin may be positioned to at least partially cover the spar along the pressure side and the suction side.

In illustrative embodiments, a first plurality of axially extending grooves may be formed in the exterior surface of the spar on the suction side that defines a first plurality of cooling passageways between the spar and the skin. A second plurality of axially extending grooves may be formed in the exterior surface of the spar on the pressure side that defines a second plurality of cooling passageways between the spar and the skin. A first plurality of inlet ports may be formed in the spar and in fluid communication with the cooling air plenum and the first plurality of cooling passageways to pass the flow of cooling air into the first plurality of cooling passageways from the cooling air plenum. A second plurality of inlet ports may be formed in the spar and in fluid communication with the cooling air plenum and the second plurality of cooling passageways to pass the flow of cooling air into the second plurality of cooling passageways from the cooling air plenum. The first plurality of cooling passageways may extend between the first plurality of inlet ports and a first plurality of outlet slots positioned axially aft of the first plurality of inlet ports. The second plurality of cooling passageways may extend between the second plurality of inlet ports and a second plurality of outlet slots positioned axially aft of the second plurality of inlet ports. The first and second plurality of outlet slots may be configured to pass the flow of cooling air from the first and second plurality of cooling passageways to an exterior of the airfoil. A first plurality of turbulators may be positioned within the first plurality of cooling passageways. A second plurality of turbulators may be positioned within the second plurality of cooling passageways.

In illustrative embodiments, the first plurality of outlet slots may be positioned axially aft of the second plurality of outlet slots.

These and other features of the present disclosure will become more apparent from the following description of the illustrative embodiments.

BRIEF DESCRIPTION OF THE DRAWINGS

FIG. 1 is an axial perspective view of a blade for use in a gas turbine engine showing that the blade includes one embodiment of an airfoil in accordance with the present disclosure and a pair of pedestals coupled to the airfoil;

FIG. 2 is a radial perspective view of the airfoil of FIG. 1 showing that the airfoil includes a spar defining an interior cooling air plenum and skin panels coupled to an exterior surface of the spar;

FIG. 3 is a detail view of the blade of FIG. 1 showing that a plurality of grooves are formed in the spar and positioned to receive cooling air from the interior cooling air plenum and showing that a plurality of turbulators are positioned within the grooves;

FIG. 5 is a sectional view taken along line 5-5 in FIG. 3 showing that the skin panels are coupled to a plurality of stand-offs which are positioned between adjacent cooling passageways and suggesting that the turbulators can be positioned on various surfaces within the cooling passageways;

FIG. 6 is a sectional view of the airfoil of FIG. 1 showing that cooling passageways extend along a pressure side and a suction side of the airfoil and suggesting that cooling air enters the cooling passageways from the interior cooling air plenum of the spar through inlet ports and exits from the cooling passageways to an exterior of the airfoil through outlet ports;

FIG. 7 is a detail view of the airfoil of FIG. 6 showing that, in one embodiment, the turbulators are angled relative to the cooling passageway;

FIG. 13 is a detail view of the spar of FIG. 3 showing that, in one embodiment, the cooling passageway decreases in height and increases in width in the tail section of the airfoil;

FIG. 14 is a sectional view taken along line 14-14 in FIG. 13 showing that the cooling passageway height is decreased by decreasing a depth of the groove formed in the spar;

DETAILED DESCRIPTION OF THE DRAWINGS

Figure 4:
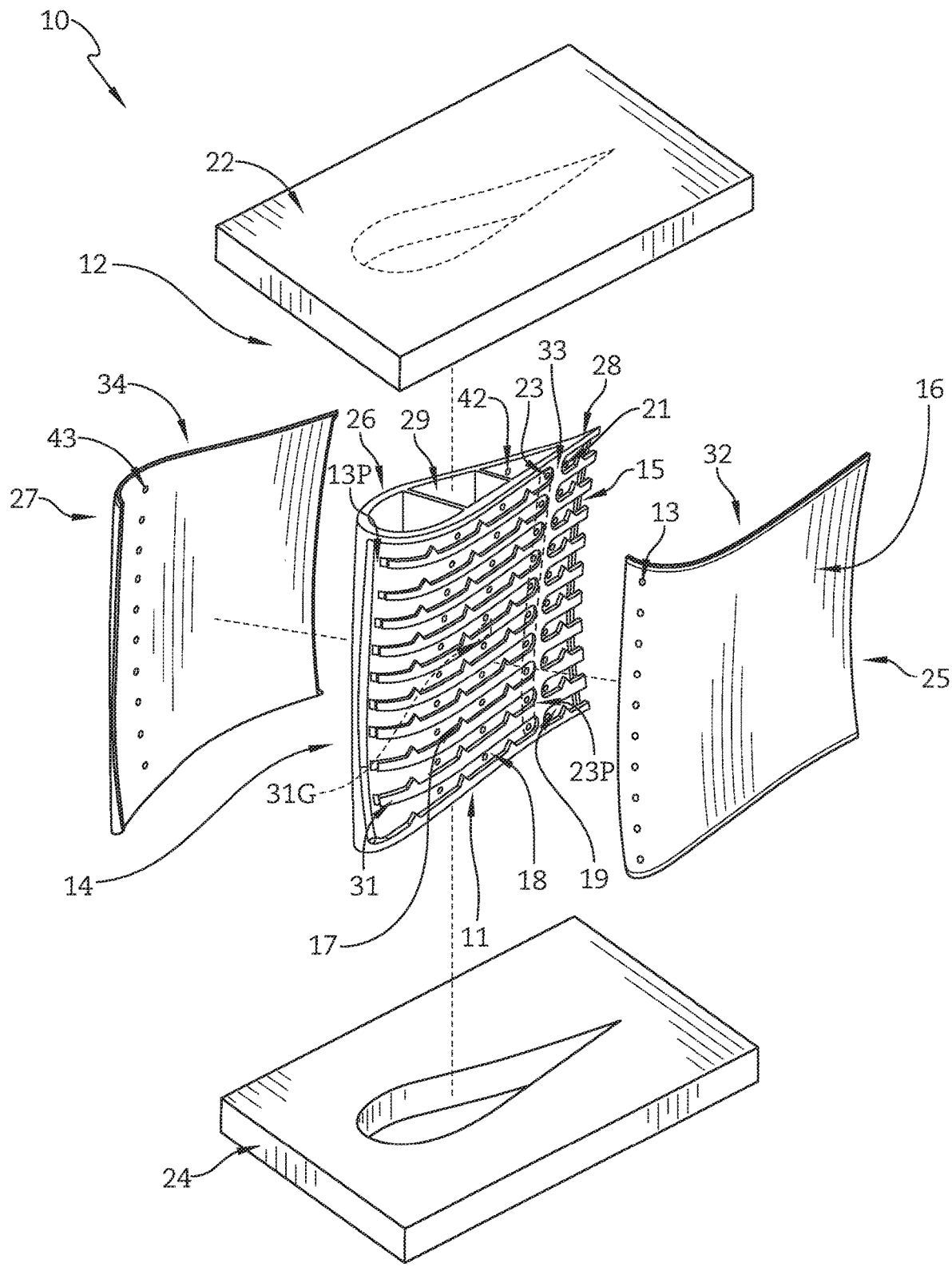
FIG. 4 is an exploded assembly view of the blade of FIG. 1 showing that the skin panels couple with the spar to cover the grooves and define cooling passageways for passing cooling air between the spar and skin panels.

For the purposes of promoting an understanding of the principles of the disclosure, reference will now be made to a number of illustrative embodiments illustrated in the drawings and specific language will be used to describe the same.

FIG. 1 shows an illustrative blade 10 of a gas turbine engine in accordance with the present disclosure. The blade 10 includes a radially outer pedestal 22, a radially inner pedestal 24, and an airfoil 12 coupled between the outer and inner pedestals 22, 24. The outer and inner pedestals 22, 24 support the airfoil 12. In some embodiments, the blade 10 is a turbine blade in a turbine section of the gas turbine engine and configured to rotate about a central axis of the engine. In some embodiments, the blade 10 is part of a static vane assembly in a turbine section of the gas turbine engine. In some embodiments, the blade 10 includes a dovetail-shaped root coupled to the airfoil 12 for connecting the blade 10 to a disk for rotation about a central axis of the engine.

The airfoil 12 (sometimes called a dual-wall airfoil) includes an internal spar 14 and an external skin 16 coupled to the spar 14 as seen in FIG. 1. In some embodiments, the spar 14 is formed from a metallic material, such as high-temperature resistant alloy. In some embodiments, the skin 16 is formed from a metallic material, such as high-temperature resistant alloy. In some embodiments, the spar 14 is formed from a ceramic material, such as a ceramic-matrix composite material, for example. In some embodiments, the skin 16 is formed from a ceramic material, such as a ceramic-matrix composite material, for example.

The spar 14 is formed to include an array of grooves 11 which define a plurality of cooling passageways between the spar 14 and the skin 16. In some embodiments the spar 14 is formed through a casting process to include the array of grooves 11. In some embodiments, the spar 14 is machined to form the array of grooves 11. In some embodiments, the spar 14 and skin 16 are integrally formed with one another and the array of grooves 11 are formed between the spar 14 and skin 16. In some embodiments, the airfoil 12 is formed as a unitary component through a casting or 3-D printing process, for example.

The spar 14 includes a body section 26 and tail section 28 and is formed to define a cooling air plenum 29 as seen in FIG. 2. The cooling air plenum 29 is adapted to receive a flow of cooling air. In some embodiments, the flow of cooling air is supplied through one or more of the pedestals 22, 24 of the blade 10. In some embodiments, the flow of cooling air is supplied through a dovetail-shaped root coupled to the airfoil 12. In the illustrative embodiment, the flow of cooling air is fed into the cooling passageways by inlet ports 21, 23 formed through the spar 14.

The array of grooves 11 formed in the spar 14 includes a plurality of body section grooves 18 and a plurality of tail section grooves 19 as seen in FIG. 3. In the illustrative embodiment, the tail section grooves 19 extend between the inlet port 21 and an exit slot 15 defined between the spar 14 and the skin 16. Each of the body section grooves 18 and tail section grooves 19 have at least one turbulator 17 positioned therein. The use of turbulators 17 enables increased cooling by mixing the flow of cooling air while reducing the amount of cooling air needed to cool the blade 10. While the turbulators 17 are shown as extending into the grooves 18, 19 in FIG. 3, in some embodiments the turbulators are formed as troughs 17T formed in the spar 14 between the grooves 18, 19.

The body section grooves 18 extend between the inlet ports 23 and an outlet-port plenum 13P where the flow of cooling air is distributed to outlet ports 13 formed through the skin 16 as shown and suggested in FIG. 4. In some embodiments, each groove 18 distributes the flow of cooling air therein directly to the outlet ports 13 without the use of the outlet-port plenum 13P. In some embodiments, an inlet-port plenum 23P (shown in phantom) is formed in the spar 14 to distribute the flow of cooling air from the inlet ports 23 to the grooves 18.

The airfoil 12 is shaped to define a suction side 25 and a pressure side 27 as shown in FIG. 2. While reference has been made to grooves 18, 19 formed in a suction side 25 of the spar 14, an array of grooves 41 are also formed in a pressure side 27 of the spar 14 as suggested in FIG. 6. In one illustrative embodiment, the skin 16 includes a suction-side panel 32 and a pressure-side panel 34 as shown in FIG. 4. The suction-side panel 32 is coupled to the suction side of the spar 14 to at least partially cover the grooves 18, 19 to define the cooling passageways. Similarly, the pressure-side panel 34 is coupled to the pressure side of the spar 14 to at least partially cover the array of grooves 41 formed therein to define cooling passageways.

The grooves 18, 19 are radially spaced along the spar 14 to define a plurality of stand-offs 31 therebetween as shown in FIGS. 4 and 5. The skin 16 is coupled to the stand-offs 31 such that a flow of cooling air passing through one cooling passageway is separated from a flow of cooling air passing through an adjacent cooling passageway as suggested in FIG. 5. A separator wall 33 is defined between the body section grooves 18 and the tail section grooves 19 such that a flow of cooling air passing through the body section grooves 18 is separated from a flow of cooling air passing through the tail section grooves 19 as suggested in FIG. 4. In some embodiments, a gap 31G is formed in the stand-offs 31 to allow the flows of cooling air in adjacent grooves 18, 19 to transfer between the adjacent grooves 18, 19.

A width W of the grooves 18, 19 is defined between adjacent stand-offs 31 as representatively shown by body section grooves 18 in FIG. 5. Similarly, a height H of the grooves 18, 19 is defined between the spar 14 and the skin 16 and also represents a depth of the grooves 18, 19 in the spar 14. In some embodiments, the channels have a hydraulic diameter less than or equal to 0.04 inches. In some embodiments, the width W of the grooves 18, 19 is from about, or precisely, 0.02 inches to about, or precisely, 0.05 inches. In some embodiments, the height H of the grooves 18, 19 is from about, or precisely, 0.015 inches to about, or precisely, 0.035 inches.

In the illustrative embodiment, the turbulators 17 are coupled to the stand-offs 31 to extend along the height H of the grooves 18, 19 as shown in FIG. 5. In some embodiments, the turbulators 17 extend away from the stand-off 31 from about, or precisely, 0.003 inches to about, or precisely, 0.007 inches. In some embodiments, the size of the turbulators 17 are proportional to the height H and/or width W of the grooves 18, 19. In some embodiments, turbulators 35 (shown in phantom) are formed on the spar 14 to extend along the width W of the grooves 18, 19. In some embodiments, turbulators 37 (shown in phantom) are formed on the skin 16 to extend into the grooves 18, 19 and along the width W of the grooves 18, 19. Each groove 18, 19 may include any combination of turbulators 17, 35, 37.

In one illustrative embodiment, the spar includes the array of grooves 11 on the suction side 25 and an array of grooves 41 on the pressure side 27 as suggested in FIG. 6. The array of grooves 41 includes a plurality of body section grooves 48 formed in the body section 26 of the spar 14 and a plurality of tail section grooves 49 formed in the tail section 28. The grooves 48, 49 include turbulators 47 similar to turbulators 17. In some embodiments, the turbulators 47 are positioned at an angle $\alpha$ relative to the groove they are positioned in, as representatively shown by turbulators 47 in groove 49 in FIG. 7. The angle $\alpha$ is from about, or precisely, 90 degrees to about, or precisely, 45 degrees. The turbulators 17, 35, 37 are also formed at the angle $\alpha$ with respect to the groove they are positioned in.

In the illustrative embodiment, inlet ports 46 are formed through the spar 14 to pass the flow of cooling air from the cooling air plenum 29 into the tail section grooves 49 as suggested in FIG. 6. The tail section grooves 49 extend between the inlet ports 46 and outlet slots 45 positioned axially aft of the inlet ports 46. In some embodiments, the outlet slots 45 are positioned axially forward of the outlet slots 15 of the tail section grooves 19.

In the illustrative embodiment, the tail section 28 of the spar 14 includes a forked portion 36 coupled to the body section 26 and a fin portion 38 extending axially aft from the forked portion 36. The pressure-side skin panel 34 couples with the forked portion 36, but not the fin portion 38. The suction-side skin panel 32 engages with both the forked portion 36 and fin portion 38. The flow of cooling air in the tail section grooves 49 exits through the outlet slots 45 onto the fin portion 38 and passes along the fin portion 38. The flow of cooling air in the tail section grooves 19 exits through the outlet slots 15 positioned at a tip of the fin portion 38 as suggested in FIGS. 15 and 16. In some embodiments, axially-aft, radially-extending edges of the skin panels 32, 34 are beveled or thinned along an exterior surface thereof to minimize a thickness of the trailing edge of the airfoil 12.

In the illustrative embodiment, inlet ports 42 are formed through the spar 14 to pass the flow of cooling air from the cooling air plenum 29 into the body section grooves 48 as suggested in FIG. 6. Outlet ports 43 are formed through the skin 16 and positioned axially forward of the inlet ports 42. The body section grooves 48 extend between the inlet ports 42 and outlet ports 43. In some embodiments, the outlet ports 43 are positioned axially aft of a leading edge of the airfoil 12. In some embodiments, the outlet ports 13 associated with the body section grooves 18 are positioned substantially at a leading edge of the airfoil 12.

The flow of cooling air in the cooling air plenum 29 passes into the array of grooves 11 and the array of grooves 41 through the inlet ports 21, 23 and 42, 46, respectively. The flow of cooling air passes through the cooling passageways formed by the arrays of grooves 11, 41 and exits through the outlet ports 13, 43 and outlet slots 15, 45 to an exterior of the airfoil 12. A throat at the leading edge $T_{LE}$ and a throat at the trailing edge $T_{TE}$ are defined between adjacent airfoils 12 when the blades 10 are arranged in the gas turbine engine. In the illustrative embodiment, the outlet ports 13, 43 and outlet slot 15, 45 are positioned such that the flow of cooling air exiting the cooling passageways is not released onto the suction side 25 of the airfoil 12 between the throat at the leading edge $T_{LE}$ and the throat at the trailing edge $T_{TE}$.

The number and position of the inlet ports, the number and position of turbulators, and the number and shape of the grooves are adjustable in accordance with the present disclosure to tailor cooling of the airfoil 12 as suggested in FIGS. 8-12. Grooves 18, 19 and turbulators 17 are representatively used to show various configurations for the cooling passageways. However, the disclosure herein also applies to grooves 48, 49 and turbulators 35, 37, 47.

Figure 8:
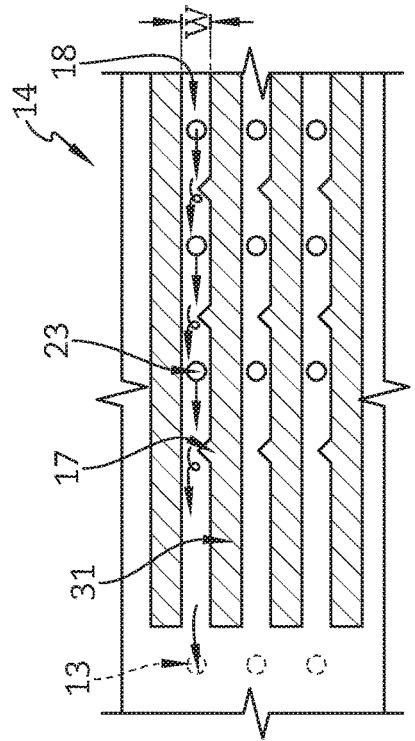
FIG. 8 is a sectional view taken along line 8-8 in FIG. 6 showing that, in one embodiment, cooling passageways in a body section of the airfoil include a plurality of inlet ports and a plurality of turbulators evenly spaced relative to one another in the cooling passageway and suggesting that the turbulators create vortices in a flow of cooling air passing through the cooling passageway.

In one illustrative embodiment, a plurality of body section grooves 18 are separated by a plurality of stand-offs 31 as shown in FIG. 8. Each body section groove 18 includes a plurality of inlet ports 23 (in this case three inlet ports) evenly spaced from one another toward a leading edge of the airfoil (to the left in the figure). Each body section groove 18 also includes a plurality of turbulators 17 (in this case three turbulators) evenly spaced from one another and positioned in between the inlet ports 23. The turbulators 17 are formed on radially inner stand-offs 31 of each groove 18. A width W of the groove 18 is substantially constant along a length of the groove 18. The flow of cooling air enters the body section grooves 18 through the inlet ports 23 and flows toward the outlet port 13 (shown in phantom). The flow of cooling air is mixed and creates vortices in the body section groove 18 as the flow of cooling air passes around the turbulators 17.

Figure 9:
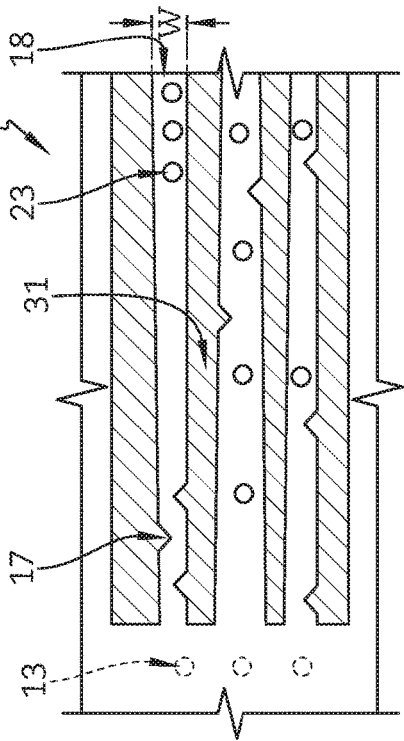
FIG. 9 is a view similar to FIG. 8 showing that, in some embodiments, the inlet ports and turbulators are variably spaced along the cooling passageways and showing that a height of the cooling passageways is variable along a length of the cooling passageways.

In another illustrative embodiment, a plurality of body section grooves 18 are separated by a plurality of stand-offs 31 as shown in FIG. 9. Each body section groove 18 has a different number and relative position of inlet ports 23 and turbulators 17. In a first groove 18, a plurality of inlet ports 23 (in this case three inlet ports) are positioned at an axially-aft end of the groove 18 (to the right in the figure) while a plurality of turbulators 17 (in this case three turbulators) are positioned at an axially-fore end of the groove 18 (to the left in the figure). The inlet ports 23 are closely spaced to one another and spaced apart from the plurality of turbulators 17. The turbulators 17 are closely spaced to one another, and two of the turbulators 17 are formed on a radially inner stand-off 31 while the third is formed on a radially outer stand-off 31 of the groove 18. A width W of the groove 18 is substantially constant along a length of the groove 18. The flow of cooling air enters the body section groove 18 through the inlet ports 23 and flows toward the outlet port 13 (shown in phantom).

In a second groove 18, a plurality of inlet ports 23 (in this case four inlet ports) are evenly spaced apart from one another along the groove 18 as shown in FIG. 9. A first turbulator 17 is formed on a radially inner stand-off 31 between two of the inlet ports 23 while a second turbulator 17 is formed on a radially outer stand-off 31 of the groove 18 between another two of the inlet ports 23. A width W of the groove 18 increases from an axially-aft end of the groove 18 (to the right in the figure) to an axially-fore end (to the left in the figure). The flow of cooling air enters the body section groove 18 through the inlet ports 23 and flows toward the outlet port 13 (shown in phantom).

In a third groove 18, two inlet ports 23 are spaced apart from one another in the groove 18 as shown in FIG. 9. A first turbulator 17 is formed on a radially inner stand-off 31 between the two inlet ports 23 and positioned proximate the inlet port 23 at an axially-aft end of the groove 18 (to the right in the figure). Two more turbulators 17 are formed on a radially inner stand-off 31 forward of the inlet ports 23 (to the left in the figure) and spaced apart from one another. A width W of the groove 18 is substantially constant along a length of the groove 18. The flow of cooling air enters the body section groove 18 through the inlet ports 23 and flows toward the outlet port 13 (shown in phantom).

In the illustrative embodiment of FIG. 8, all of the body section grooves 18 have a similar configuration. However, as suggested in FIG. 9, the configurations of adjacent grooves 18 can be different. Any of the above described configurations can be used for any of the grooves 18 formed along the spar 14. The specific configuration for a given groove 18 can be chosen based on the cooling requirements at that position along the airfoil 12. The above described configurations are only a few possible configurations for the body section grooves 18 and should not be considered limiting of the disclosure.

Figure 10:
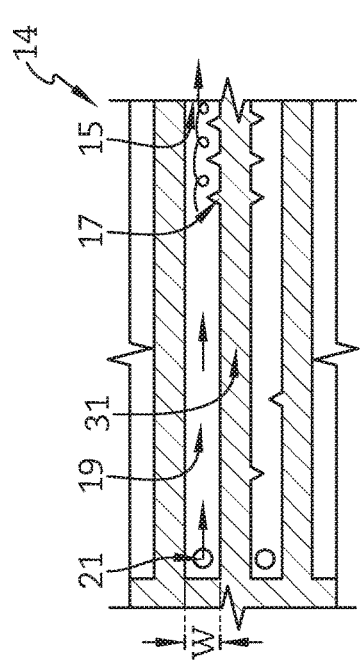
FIG. 10 is a sectional view taken along line 10-10 in FIG. 6 showing that, in one embodiment, cooling passageways in a tail section of the airfoil include a single inlet port and a plurality of turbulators and suggesting that the turbulators create vortices in a flow of cooling air passing through the cooling passageway to increase heat transfer to the cooling air as the tail section thins.

In another illustrative embodiment, a plurality of tail section grooves 19 are separated by a plurality of stand-offs 31 as shown in FIG. 10. Each tail section groove 19 has a different number and relative position of turbulators 17. In a first groove 19, an inlet port 21 is positioned at an axially-fore end of the groove 19 (to the left in the figure) while a plurality of turbulators 17 (in this case three turbulators) are positioned at an axially-aft end of the groove 19 (to the right in the figure). The plurality of turbulators 17 are formed on a radially inner stand-off 31 and closely spaced to one another. A width W of the groove 19 is substantially constant along a length of the groove 19. The flow of cooling air enters the tail section groove 19 through the inlet port 21 and flows toward an outlet slot 15. The turbulators 17 are positioned proximate the outlet slot 15 of the groove 19, and the flow of cooling air is mixed and creates vortices in the tail section groove 19 as the flow of cooling air passes around the turbulators 17. Concentrated mixing from the turbulators 17 at a trailing edge of the airfoil 12, where the airfoil 12 is thinnest and most subject to temperature induced distortion, increases the amount of heat transfer between the airfoil 12 and the flow of cooling air to limit the temperature of the fin portion 38 of the tail section 28 and the portion of skin 16 coupled thereto.

In a second groove 19, an inlet port 21 is positioned at an axially-fore end of the groove 19 (to the left in the figure) while a plurality of turbulators 17 (in this case five turbulators) are positioned axially-aft of the inlet port 21 (to the right in the figure). Three of the turbulators 17 are formed on a radially outer stand-off 31 and closely spaced to one another proximate an outlet slot 15 of the groove 19. The other two turbulators 17 are positioned between the inlet port 21 and the three turbulators 17 proximate the outlet slot 15, with one turbulator 17 formed on the radially outer stand-off 31 and the other formed on a radially inner stand-off 31. A width W of the groove 19 is substantially constant along a length of the groove 19. The flow of cooling air enters the tail section groove 19 through the inlet port 21 and flows toward the outlet slot 15.

Figure 11:
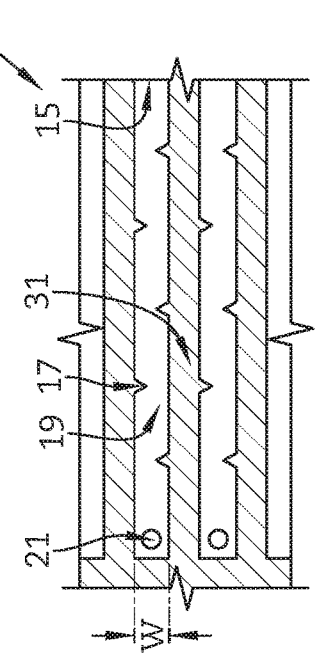
FIG. 11 is a view similar to FIG. 10 showing that, in some embodiments, the turbulators are evenly spaced along the cooling passageways.

In another illustrative embodiment, a plurality of tail section grooves 19 are separated by a plurality of stand-offs 31 as shown in FIG. 11. Each tail section groove 19 includes an inlet port 21 positioned at an axially-fore end of the groove 19 (to the left in the figure) and a plurality of turbulators 17 (in this case five turbulators). The turbulators 17 are evenly spaced from one another along the groove 19 with two of the turbulators 17 formed on a radially outer stand-off 31 and the other three formed on a radially inner stand-off 31. A width W of the groove 19 is substantially constant along a length of the groove 19. The flow of cooling air enters the tail section grooves 19 through the inlet ports 21 and flows toward the outlet slots 15.

Figure 12:
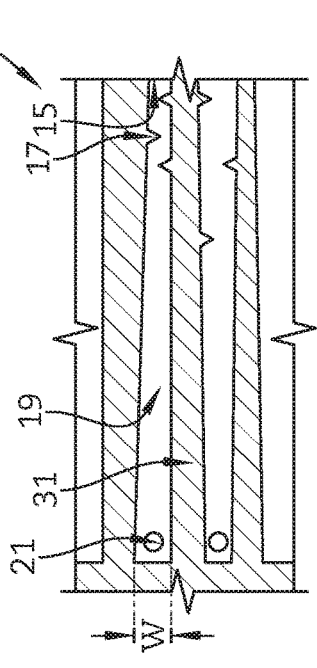
FIG. 12 is a view similar to FIG. 10 showing that, in some embodiments, the turbulators are positioned near an outlet slot of the cooling passageway and showing that a height of the cooling passageways is variable along a length of the cooling passageways.

In another illustrative embodiment, a plurality of tail section grooves 19 are separated by a plurality of stand-offs 31 as shown in FIG. 12. Each tail section groove 19 has a different relative position of turbulators 17. In a first groove 19, an inlet port 21 positioned at an axially-fore end of the groove 19 (to the left in the figure) while a plurality of turbulators 17 (in this case three turbulators) are positioned at an axially-aft end of the groove 19 (to the right in the figure). The turbulators 17 are closely spaced to one another, and two of the turbulators 17 are formed on a radially inner stand-off 31 while the third is formed on a radially outer stand-off 31 of the groove 19. A width W of the groove 19 reduces from the axially-fore end of the groove 19 to the axially-aft. The flow of cooling air enters the tail section groove 19 through the inlet port 21 and flows toward the outlet slot 15.

In a second groove 19, an inlet port 21 positioned at an axially-fore end of the groove 19 (to the left in the figure) while a plurality of turbulators 17 (in this case three turbulators) are positioned at an axially-aft end of the groove 19

(to the right in the figure). The turbulators 17 are spaced apart from one another, and two of the turbulators 17 are formed on a radially outer stand-off 31 while the third is formed on a radially inner stand-off 31 of the groove 19. A width W of the groove 19 increases from the axially-fore end of the groove 19 to the axially-aft. The flow of cooling air enters the tail section groove 19 through the inlet port 21 and flows toward the outlet slot 15.

In the illustrative embodiment of FIG. 11, all of the tail grooves 19 have a similar configuration. However, as suggested in FIGS. 10 and 12, the configurations of adjacent grooves 19 can be different. Any of the above described configurations can be used for any of the grooves 19 formed along the spar 14. The specific configuration for a given groove 19 can be chosen based on the cooling requirements at that position along the airfoil 12. Also, while a single inlet port 21 is shown for each groove 19 in FIGS. 10-12, multiple inlet ports 21 may be used to provide the flow of cooling air. The above described configurations are only a few possible configurations for the tail grooves 19 and should not be considered limiting of the disclosure.

In one illustrative embodiment, the tail section grooves 19 contract in height and expand in width as they extend axially aft as suggested in FIGS. 13 and 14. In the illustrative embodiment, the tail section grooves 19 include a fore section 52, a transition section 54, and an aft section 56. The transition section 54 connects the fore section 52 with the aft section 56. A cross-sectional area 51 of the fore section 52 substantially matches in size a cross-sectional area 53 of the aft section 56 to match a flow rate through the two sections 52, 56. The increased height of the aft section 56 provides a higher surface area contact with the skin 16 in the aft section 56 to increase cooling at the trailing edge where the airfoil 12 is thinnest and most subject to temperature induced distortion. The illustrative tail section groove 19 is formed by reducing a depth of cut of the groove 19 into spar 14, as suggested in FIG. 14, and expanding the groove 19 radially, as suggested in FIG. 13.

Figure 16:
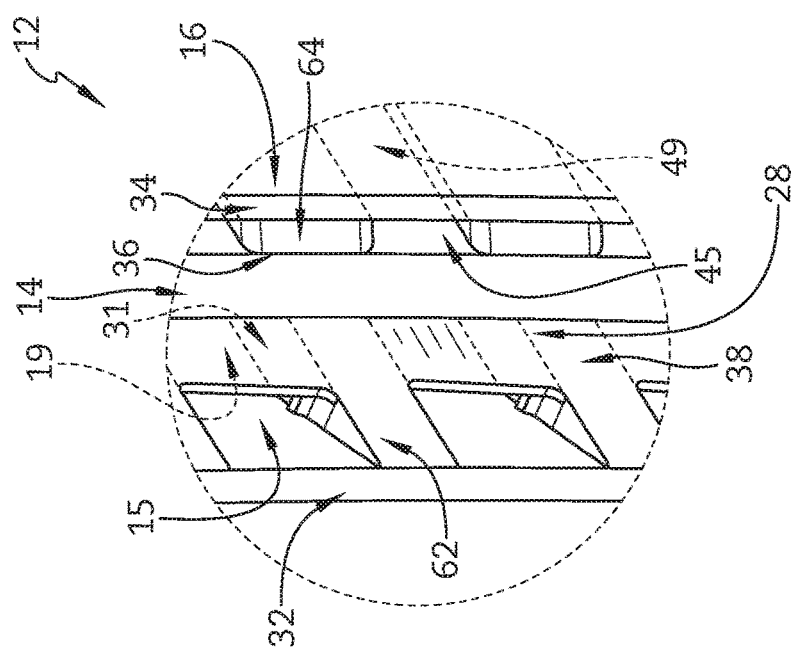
FIG. 16 is a detail view of the tail section of FIG. 15 showing that a fin portion of the tail section is formed to include triangular supports to at least partially support the skin at a trailing edge of the airfoil.
Figure 15:
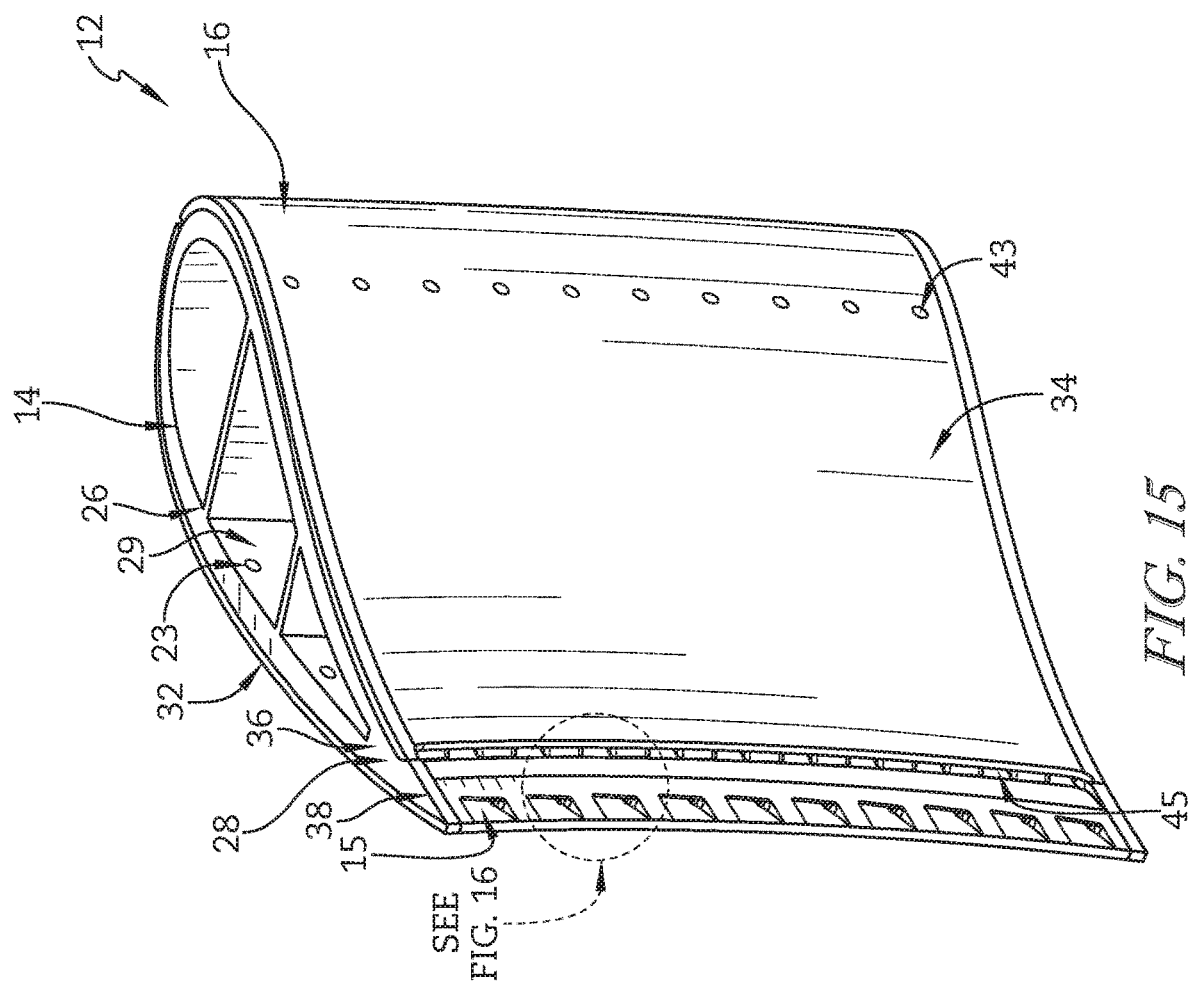
FIG. 15 is a an axial perspective view of the airfoil of FIG. 2 showing that the tail section of the airfoil includes substantially rectangular outlet slots to allow the flow of cooling air in the cooling passageways to exit.

The outlet slots 15, 45 of grooves 19, 49, respectively, allow the flow of cooling air to exit the airfoil 12 out of the trailing edge as suggested in FIG. 15. In the illustrative embodiment, the outlet slots 15, 45 are substantially rectangular in cross-section as shown in FIG. 16. In some embodiments, triangular supports 62 are coupled to the stand-offs 31 to allow the suction-side skin panel 32 to extend past the outlet slots 15 and minimize a thickness of the trailing edge. Similar to the stand-offs 31, a plurality of stand-offs 64 are positioned between the grooves 49, 48, as representatively shown by grooves 49 in FIG. 16, to define the plurality of cooling passageways between the skin 16 and the spar 14. The pressure-side skin panel 34 is coupled to the stand-offs 64 such that a flow of cooling air passing through one cooling passageway is separated from a flow of cooling air passing through an adjacent cooling passageway.

In illustrative embodiments, "micro-size" channels in conjunction with "micro-sized" turbulators are used to provide high internal cooling effectiveness and efficiently deliver coolant to a film hole row that is in a less costly position. In some embodiments, the channels vary in cross-sectional area and aspect ratio along the length of the channel. The turbulators are located on one or more walls of the channel and anywhere along the length of the channel. In some embodiments, the turbulator heights are less than or equal to 30% of the hydraulic diameter of the channel. The channels are fed by intermittent cooling holes connected to the main cooling passages of the airfoil. The spacing and number of the holes can be varied to deliver higher cooling flow rates, higher internal effectiveness, or both. Coolant air enters the cooling channel and flows along the smooth surface before being tripped by turbulators located along the channel. In some embodiments, the channels discharge into a plenum that then feeds one or multiple film hole rows. In other embodiments, the channels discharge into trailing edge slots.

In illustrative embodiments, the cooling channels run below the airfoil surface to transport cooling air to one or more film hole rows. The channel area and aspect ratio vary to minimize the pressure drop (or cooling air volume) and maximize the heat transfer. Impingement holes and turbulators are also positioned along the length of the channel. The channels shape, impingement hole location/quantity, and turbulator location/quantity are all optimized to maintain the desired cooling flow rate and heat transfer over the entire length of the channel. The film holes are then optimized to reduce the aerodynamic penalty and further reduce surface temperatures. Embedding the channels below the airfoil surface allows for higher cooling effectiveness. The channels with turbulators have less pressure drop while still maintaining high cooling effectiveness. This means the channels can run much further along the airfoil surface while still delivering the desired film flow rate.

In illustrative embodiments, the small size of the "micro channels" means they can be fit into the trailing edge of the airfoils while providing the required cooling. By adjusting the area and aspect ratio of the channels more or less cooling flow can pass through the channel and more or less of it can be exposed to the hot wall. Turbulators are added to increase the internal cooling effectiveness or omitted to increase cooling air flow depending on the requirements. The decoupling of the flow path (channels) and internal cooling device (turbulators) means the design can be easily changed. The flexibility of the turbulator configuration means this cooling design can achieving higher overall cooling effectiveness by adapting the cooling profile across the airfoil.

In illustrative embodiments, the cooling channels are located on the pressure and/or suction side of the airfoil and are fed by the main airfoil passages at one or multiple locations. The cooling flow enters the channel and then travels to the film hole row(s). The film hole rows can be either upstream (closer to leading edge) or downstream (closer to trailing edge) from the channel inlet holes. Turbulators are added in between the channel feed holes and/or between the feed holes and film holes.

In illustrative embodiments, the trailing edge channels are fed from the main coolant passage of the airfoil and discharge into a trailing edge slot. The channels are located underneath the pressure side surface and/or under the suction side surface. Turbulators are placed in the channel as required to achieve the desired cooling effectiveness.

In illustrative embodiments, the "dual wall" structure of the airfoil allows the channels to separate the inner "support" wall of the spar from the pressure/suction side walls of the skin. This keeps the support wall much cooler (and therefore stiffer) than the gas path surfaces. Having the channels just below the gas path surface also means it will be more efficient at reducing the temperature. By utilizing the micro-channels with turbulators a more efficient and flexible cooling design can be implemented.

What is claimed is:

1. An airfoil for use in a gas turbine engine and having a pressure side and a suction side, the airfoil comprising
 a spar that extends radially relative to an axis and formed to define a cooling air plenum adapted to receive a flow of cooling air, and a skin coupled to an exterior surface of the spar and positioned to at least partially cover the spar along the pressure side and the suction side, wherein a first plurality of axially extending grooves is formed in the exterior surface of the spar on the suction side that defines a first plurality of cooling passageways between the spar and the skin, a second plurality of axially extending grooves is formed in the exterior surface of the spar on the pressure side that defines a second plurality of cooling passageways between the spar and the skin, wherein a first plurality of inlet ports is formed in the spar and in fluid communication with the cooling air plenum and the first plurality of cooling passageways to pass the flow of cooling air into the first plurality of cooling passageways from the cooling air plenum, a second plurality of inlet ports is formed in the spar and in fluid communication with the cooling air plenum and the second plurality of cooling passageways to pass the flow of cooling air into the second plurality of cooling passageways from the cooling air plenum, and wherein the first plurality of cooling passageways extending between the first plurality of inlet ports and a first plurality of outlet slots positioned axially aft of the first plurality of inlet ports, the second plurality of cooling passageways extending between the second plurality of inlet ports and a second plurality of outlet slots positioned axially aft of the second plurality of inlet ports, and the first and second plurality of outlet slots are configured to pass the flow of cooling air from the first and second plurality of cooling passageways to an exterior of the airfoil, wherein the first plurality of axially extending grooves are radially spaced apart from one another to define a first plurality of stand-offs therebetween, the second plurality of axially extending grooves are radially spaced apart from one another to define a second plurality of stand-offs therebetween, wherein the spar further includes triangular supports that are each coupled to each stand-off of the first plurality of stand-offs to allow the skin to extend beyond the first plurality of outlet slots.

2. The airfoil of claim 1, wherein the first plurality of outlet slots are positioned axially aft of the second plurality of outlet slots.

3. The airfoil of claim 2, wherein the first plurality of outlet slots open toward the pressure side.

4. The airfoil of claim 1, wherein a height of each cooling passageway included in the first and second plurality of cooling passageways is defined between the spar and the skin and a width of each cooling passageway included in the first and second plurality of cooling passageways is defined between adjacent stand-offs.

5. The airfoil of claim 4, wherein at least one of the cooling passageways included in the first and second plurality of cooling passageways have a variable height and variable width along a length of the at least one of the cooling passageways.

6. The airfoil of claim 4, wherein a radial width of each of the first plurality of outlet slots is different than the width of each cooling passageway included in the plurality of first cooling passageways.

7. The airfoil of claim 1, further comprising a first plurality of turbulators positioned within the first plurality of cooling passageways and a second plurality of turbulators positioned within the second plurality of cooling passageways.

8. The airfoil of claim 7, wherein the second plurality of turbulators are angled relative to the second plurality of cooling passageways.

9. The airfoil of claim 7, wherein the skin is bonded to the first plurality of stand-offs and the second plurality of stand-offs such that the flow of cooling air in one cooling passageway of the first and second plurality of cooling passageways is separated from the flow of cooling air in an adjacent cooling passageway.

10. The airfoil of claim 9, wherein the first plurality of turbulators are coupled to the first plurality of stand-offs to extend along the height of the first plurality of cooling passageways and the second plurality of turbulators are coupled to the second plurality of stand-offs to extend along the height of the second plurality of cooling passageways.

11. The airfoil of claim 1, wherein each cooling passageway of the first plurality of cooling passageways has a single inlet port associated therewith and each cooling passageway of the second plurality of cooling passageways has a single inlet port associated therewith.

12. An airfoil for use in a gas turbine engine, the airfoil comprising a spar made from a first material and extending radially relative to an axis, the spar formed to define a cooling air plenum adapted to receive a flow of cooling air, a first axially extending groove in an exterior surface of the spar on a suction side of the airfoil, a first inlet port in fluid communication with the cooling air plenum and the first axially extending groove, a second axially extending groove in the exterior surface of the spar on a pressure side of the airfoil, and a second inlet port in fluid communication with the cooling air plenum and the second axially extending groove, and a skin made from a second material different from the first material and coupled to the exterior surface of the spar along the pressure side and the suction side of the airfoil to define a first outlet slot in fluid communication with the first axially extending groove and a second outlet slot in fluid communication with the second axially extending groove, the first and second outlet slots located axially aft of the first and second inlet ports, and the first and second outlet slots being in fluid communication with an exterior of the airfoil to pass the flow of cooling air from the first and second axially extending grooves to the exterior of the airfoil, wherein the first axially extending groove extends axially between the first inlet port and the first outlet slot positioned axially aft of the first inlet port, the second axially extending groove extends axially between the second inlet port and the second outlet slot positioned axially aft of the second inlet port, wherein the first axially extending groove is defined by radially spaced apart first stand-offs, the second axially extending groove is defined by radially spaced apart second stand-offs, and the spar further includes triangular supports that are each coupled to each stand-off of the first stand-offs to allow the skin to extend beyond the first outlet slot.

13. The airfoil of claim 12, wherein the spar has an axially forward body section and an axially aft tail section, the axially aft tail section of the spar includes a forked portion coupled to the axially forward body section and a fin portion that extends axially aft from the forked portion to define a trailing edge of the airfoil, and the first outlet slot is formed in the fin portion.

14. The airfoil of claim 13, wherein the skin extends over the forked portion and the fin portion of the axially aft tail section of the spar on the suction side of the airfoil and the skin extends over the forked portion of the spar and terminates axially before the fin portion of the spar on the pressure side of the airfoil.

15. The airfoil of claim 12, wherein the first outlet slot is positioned axially aft of the second outlet slot.

16. The airfoil of claim 15, wherein the first outlet slot opens axially aft and circumferentially toward the pressure side.

17. The airfoil of claim 16, wherein the second outlet slot opens axially aft.

18. The airfoil of claim 12, wherein the first axially extending groove has a first radial width and a first circumferential height, the first outlet slot has a second radial width and a second circumferential height, the first radial width is different than the second radial width, and the first circumferential height is different than the second circumferential height.

19. An airfoil for use in a gas turbine engine, the airfoil comprising
a spar that extends radially relative to an axis, the spar formed to define a cooling air plenum, a first axially extending groove in an exterior surface of the spar on a suction side of the airfoil, a first inlet port in fluid communication with the cooling air plenum and the first axially extending groove, a second axially extending groove in the exterior surface of the spar on a pressure side of the airfoil, and a second inlet port in fluid communication with the cooling air plenum and the second axially extending groove, and
a skin coupled to the exterior surface of the spar along the pressure side and the suction side of the airfoil to define a first outlet slot in fluid communication with the first axially extending groove and a second outlet slot in fluid communication with the second axially extending groove, the first and second outlet slots located axially aft of the first and second inlet ports, and the first and second outlet slots being in fluid communication with an exterior of the airfoil
wherein the spar has an axially forward body section and an axially aft tail section, the axially aft tail section of the spar includes a forked portion coupled to the axially forward body section and a fin portion that extends axially aft from the forked portion to define a trailing edge of the airfoil, and the first outlet slot is formed in the fin portion,
wherein the first axially extending groove is formed in the forked portion of the spar and terminates at the axially aft tail section on the pressure side of the airfoil and the second axially extending groove is formed in the forked portion and axially aft tail portion of the spar on the suction side of the airfoil.

* * * * *